United States Patent
Cobb et al.

(10) Patent No.: US 9,793,537 B2
(45) Date of Patent: Oct. 17, 2017

(54) THREE DIMENSIONAL CO-EXTRUDED BATTERY ELECTRODES

(71) Applicant: PALO ALTO RESEARCH CENTER INCORPORATED, Palo Alto, CA (US)

(72) Inventors: Corie Lynn Cobb, Mountain View, CA (US); Chang-Jun Bae, Mountain View, CA (US)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 0 days.

(21) Appl. No.: 15/435,636

(22) Filed: Feb. 17, 2017

(65) Prior Publication Data
US 2017/0162858 A1 Jun. 8, 2017

Related U.S. Application Data

(62) Division of application No. 13/727,993, filed on Dec. 27, 2012, now Pat. No. 9,590,232.

(51) Int. Cl.
*H01M 4/04* (2006.01)
*H01M 4/36* (2006.01)
(Continued)

(52) U.S. Cl.
CPC ............ *H01M 4/0411* (2013.01); *B28B 3/20* (2013.01); *B28B 11/243* (2013.01);
(Continued)

(58) Field of Classification Search
None
See application file for complete search history.

(56) References Cited

U.S. PATENT DOCUMENTS 3,195,865 A   7/1965   Harder
3,382,534 A   5/1968   Veazey
(Continued)

FOREIGN PATENT DOCUMENTS

EP   0802034   10/1997
EP   1757429   2/2007
(Continued)

OTHER PUBLICATIONS

Fergus et al., "Recent Developments in Cathode Materials for Lithium Ion Batteries," Journal of Power Sources, Elsevier SA, Ch. vo. 195, No. 4, Feb. 15, 2010, pp. 939-954, XP026693512.
(Continued)

*Primary Examiner* — Scott J Chmielecki
(74) *Attorney, Agent, or Firm* — Marger Johnson

(57) ABSTRACT

A three dimensional electrode structure having a first layer of interdigitated stripes of material oriented in a first direction, and a second layer of interdigitated stripes of material oriented in a second direction residing on the first layer of interdigitated stripes of material. A method of manufacturing a three dimensional electrode structure includes depositing a first layer of interdigitated stripes of an active material and an intermediate material on a substrate in a first direction, and depositing a second layer of interdigitated stripes of the active material and the intermediate material on the first layer in a second direction orthogonal to the first direction.

10 Claims, 8 Drawing Sheets

(51) Int. Cl.
   *H01M 4/525* (2010.01)
   *B28B 3/20* (2006.01)
   *B28B 11/24* (2006.01)
   *H01M 4/02* (2006.01)

(52) U.S. Cl.
   CPC ....... *H01M 4/0402* (2013.01); *H01M 4/0471* (2013.01); *H01M 4/366* (2013.01); *H01M 4/525* (2013.01); *H01M 2004/021* (2013.01)

(56) References Cited

U.S. PATENT DOCUMENTS

| | | | |
|---|---|---|---|
| 3,583,678 A | 6/1971 | Harder | |
| 3,752,616 A | 8/1973 | Matsui et al. | |
| 3,860,036 A | 1/1975 | Newman, Jr. | |
| 4,511,528 A | 4/1985 | Kudert et al. | |
| 5,094,793 A | 3/1992 | Schrenk et al. | |
| 5,143,681 A | 9/1992 | Daubenbuchel et al. | |
| 5,154,934 A | 10/1992 | Okamoto | |
| 5,583,359 A * | 12/1996 | Ng .................... | H01L 23/5223 257/306 |
| 5,628,950 A | 5/1997 | Schrenk et al. | |
| 5,843,385 A | 12/1998 | Dugan | |
| 5,851,562 A | 12/1998 | Haggard et al. | |
| 5,882,694 A | 3/1999 | Guillemette | |
| 6,109,006 A | 8/2000 | Hutchinson | |
| 6,676,835 B2 | 1/2004 | O'Connor et al. | |
| 6,981,552 B2 | 1/2006 | Reddy et al. | |
| 7,090,479 B2 | 8/2006 | Kegasawa et al. | |
| 7,690,908 B2 | 4/2010 | Guillemette et al. | |
| 7,700,019 B2 | 4/2010 | Lavoie et al. | |
| 7,765,949 B2 | 8/2010 | Fork et al. | |
| 7,780,812 B2 | 8/2010 | Fork et al. | |
| 7,799,371 B2 | 9/2010 | Fork et al. | |
| 7,883,670 B2 | 2/2011 | Tonkovich et al. | |
| 7,922,471 B2 | 4/2011 | Fork et al. | |
| 8,206,025 B2 | 6/2012 | Natarajan | |
| 8,865,345 B1 * | 10/2014 | Ramasubramanian | C25D 13/12 429/163 |
| 2002/0074972 A1 | 6/2002 | Narang et al. | |
| 2002/0176538 A1 | 11/2002 | Wimberger-Friedl et al. | |
| 2003/0082446 A1 * | 5/2003 | Chiang .................. | H01M 4/04 429/209 |
| 2003/0111762 A1 | 6/2003 | Floyd et al. | |
| 2003/0189758 A1 | 10/2003 | Baer et al. | |
| 2006/0134518 A1 * | 6/2006 | Kogetsu ............ | H01M 4/0426 429/218.1 |
| 2007/0279839 A1 | 12/2007 | Miller | |
| 2008/0121042 A1 * | 5/2008 | Miller .................. | B81B 3/0078 73/649 |
| 2009/0194181 A1 * | 8/2009 | Masters ............ | B01L 3/502746 137/807 |
| 2010/0239700 A1 | 9/2010 | Winroth | |
| 2012/0031487 A1 * | 2/2012 | Kuang .................. | B82Y 30/00 136/256 |
| 2012/0153211 A1 * | 6/2012 | Fork ..................... | B29C 47/065 252/62.2 |
| 2012/0156364 A1 | 6/2012 | Fork et al. | |
| 2013/0149605 A1 * | 6/2013 | Kakehata ............. | H01M 4/045 429/211 |
| 2013/0164612 A1 * | 6/2013 | Tanemura ............... | H01M 4/70 429/211 |
| 2013/0171516 A1 * | 7/2013 | Wang ................ | H01M 10/0585 429/211 |
| 2014/0011088 A1 * | 1/2014 | Lopatin .................. | H01M 4/02 429/211 |

FOREIGN PATENT DOCUMENTS

| | | |
|---|---|---|
| EP | 2056352 | 5/2009 |
| EP | 2466594 | 6/2012 |
| JP | 9183147 | 7/1997 |
| JP | 2006326891 | 12/2006 |
| WO | 0121688 | 3/2001 |

OTHER PUBLICATIONS

European Search Report, dated Apr. 14, 2014, EP Application No. 13198599.6, 7 pages.

* cited by examiner

THREE DIMENSIONAL CO-EXTRUDED BATTERY ELECTRODES

RELATED APPLICATIONS

This application is a divisional of and claims priority to U.S. patent application Ser. No. 13/727,993, filed Dec. 27, 2012, which is incorporated by reference herein in its entirety.

The application is related to U.S. patent application Ser. No. 12/972,370 filed Dec. 17, 2010, now U.S. Pat. No. 9,004,001 issued Apr. 14, 2015; U.S. patent application Ser. No. 12/972,384 filed Dec. 17, 2010; U.S. patent application Ser. No. 13/727,937 filed Dec. 27, 2012; U.S. patent application Ser. No. 13/727,960 filed Dec. 27, 2012, now U.S. Pat. No. 9,012,090 issued Apr. 21, 2015; and U.S. patent application Ser. No. 13/728,016 filed on Dec. 27, 2012, now U.S. Pat. No. 9,337,471 issued on May 10, 2016.

BACKGROUND

Portable power requirements have driven the development of battery technology to achieve high energy density and good power performance. One area of development includes the manufacture of electrodes by co-extruding conductive materials onto a substrate. Two aspects of battery development involve optimizing material density and ion transport. High density means higher packing of material, which leads to higher energy storage. Less dense material results in more electrolyte filling the volume, which enables faster lithium ion transport in the electrolyte, in the case of a lithium ion battery.

The co-extrusion process has been discussed in several US patents and US patent applications. Examples of these types of battery electrodes are discussed in U.S. Pat. Nos. 7,765,949; 7,780,812; 7,922,471; and US Patent Publications 20070279839, 20120156364 and 20120153211. U.S. Pat. No. 7,765,949 discloses a device for extruding and dispensing materials on a substrate, the device has at least two channels for receiving materials and an exit port for extruding the materials onto the substrate. U.S. Pat. No. 7,780,812 discloses another such device having a planarized edge surface. U.S. Pat. No. 7,922,471 discloses another such device for extruding materials that have an equilibrium shape that does not settle after deposition onto the substrate. US Patent Publication 20070279839 discloses a co-extrusion technique employing a honeycomb structure. US Patent Publications 20120156364 and 20120153211 disclose a co-extrusion head that combines streams of two or more materials into an interdigitated structure on a substrate, where there are multiple stripes of the materials.

In addition to the development of co-extruded materials, development has begun in three dimensional architectures. These three dimensional architectures achieve improved battery performance by reconfiguring the electrode materials currently employed in uniform monolithic batteries. A variety of three dimensional structures have been achieved as shown in FIG. 1. One example 10 has interdigitated cylindrical cathodes and anodes. Another example 12 has interdigitated cathodes and anodes with rectangular cross-sections. Yet another example 14 shows an array of cylindrical anodes coated with the thin layer of ion-conducting electrolyte with the remaining free volume filled with the cathode material. A last example 16 shows what is referred to as an 'aperiodic sponge' architecture in which the solid network of the sponge serves as the charge insertion cathode, which is coated with an ultrathin layer of ion-conducting electrolyte, and the remaining free volume is filled with an interpenetrating, continuous anode.

These architectures do have improved performance but are difficult to manufacture. The realization of the improvements can only occur if someone can manufacture the structures in a cost-efficient manner.

DETAILED DESCRIPTION OF THE EMBODIMENTS

Figure 1:
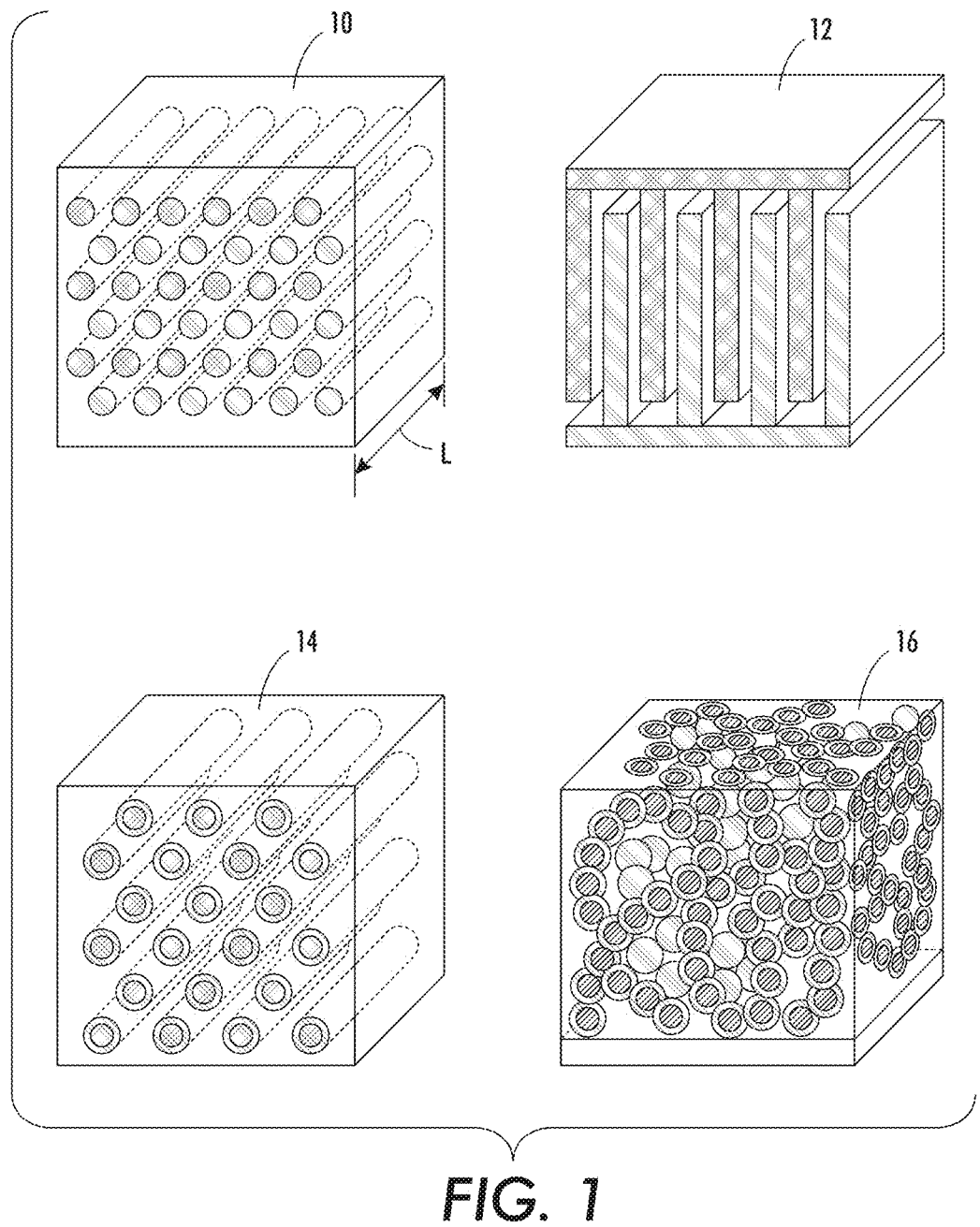
FIG. 1 shows examples of several three dimensional battery structures
Figure 2:
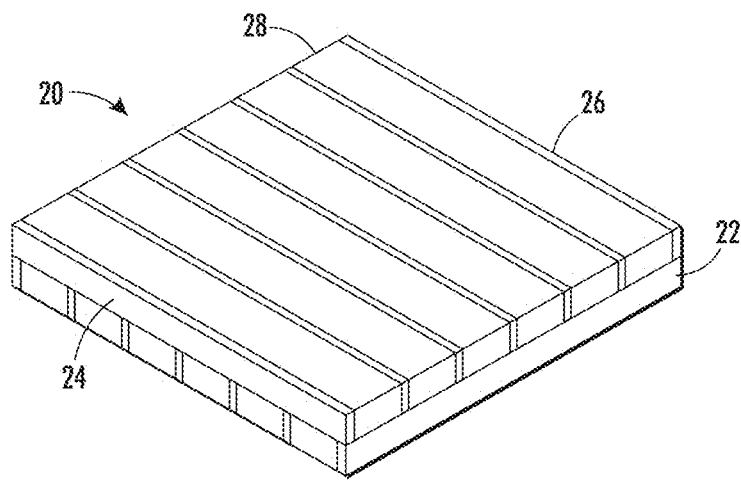
FIG. 2 shows an embodiment of a three dimensional electrode structure formed from a co-extrusion device.

FIG. 2 shows an embodiment of three dimensional electrode structure 20 of a battery. One should note that while this electrode structure is discussed here as being part of a battery, it could be an electrode for any number of structures other than a battery such as an ultracapacitor or fuel cells. Further, the electrode could be the cathode or the anode of a battery.

In the embodiment of FIG. 2, the electrode structure has two layers, 22 and 24. The layers consist of interdigitated stripes of material. The layer 22 has stripes oriented in a first direction. The layer 24 has stripes oriented in a second direction, orthogonal to the first direction. In this embodiment, the interdigitated stripes are of an electrode or active material 26 and a sacrificial material 26. The electrode material may be any active conductive material. In the case of a secondary battery, this may be a lithium compound or graphite mixture. In the case of a primary battery the electrode may be part of an alkaline system that uses zinc, and manganese dioxide. The material 24 may be a sacrificial or fugitive material.

As will be discussed in more detail further, the sacrificial material may be burned off in a firing process. This would leave gaps between the stripes of active material. When the layers are packaged into a battery structure, the gaps may be filled with a liquid or gel electrolyte. Alternative to the liquid or gel electrolyte, the gaps may be filled with a highly porous material that will then be filled with electrolyte. As another alternative, the stripes of material other than the active material may consist of the highly porous material and would not be removed. Because it is not actually a sacrificial material, this material will be referred to as the intermediate material.

Figure 3:
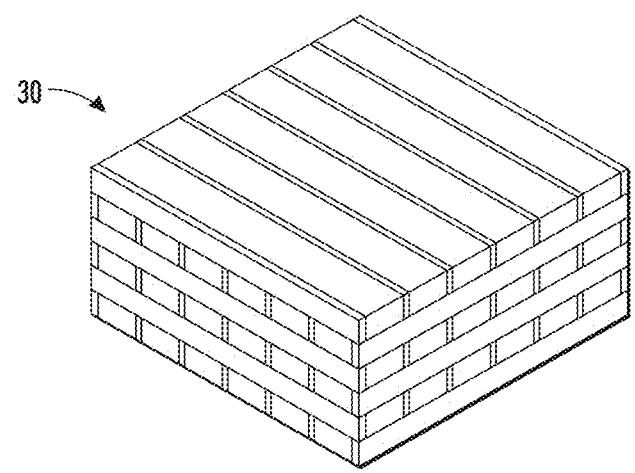
FIG. 3 shows another embodiment of a three dimensional electrode structure formed from a co-extrusion device.

FIG. 3 shows an alternative embodiment of a three dimensional electrode structure 30. In this embodiment, there are six layers of interdigitated stripes. Each stripe is referred to here as being orthogonal, meaning that the layer is orthogonal to the layer directly underneath it. Each layer will run in the same direction as the layer, if there is one, two layers down from the current layer. There is no limitation as to the number of layers other than the desire of the system designer.

These structures may be manufactured by any of the embodiments of the co-extrusion print heads discussed above and shown in FIG. 5. The print heads such as 45 generally deposit two or more materials in adjacent, interdigitated stripes. The interdigitated stripes will not typically mix between the materials, although in some embodiments there may be some limited mixing.

Using one of these types of print heads, a first experimental realization of three dimensional electrode occurred. The electrode structure consists of 2 layers, in this embodiment each 125 micrometers (um) tall, stacked in an orthogonal manner to yield a 250 um thick cathode electrode. In this particular experiment, the active material is lithium cobalt oxide in approximately 270 um wide stripes with 170 um wide sacrificial material stripes.

Figure 4:
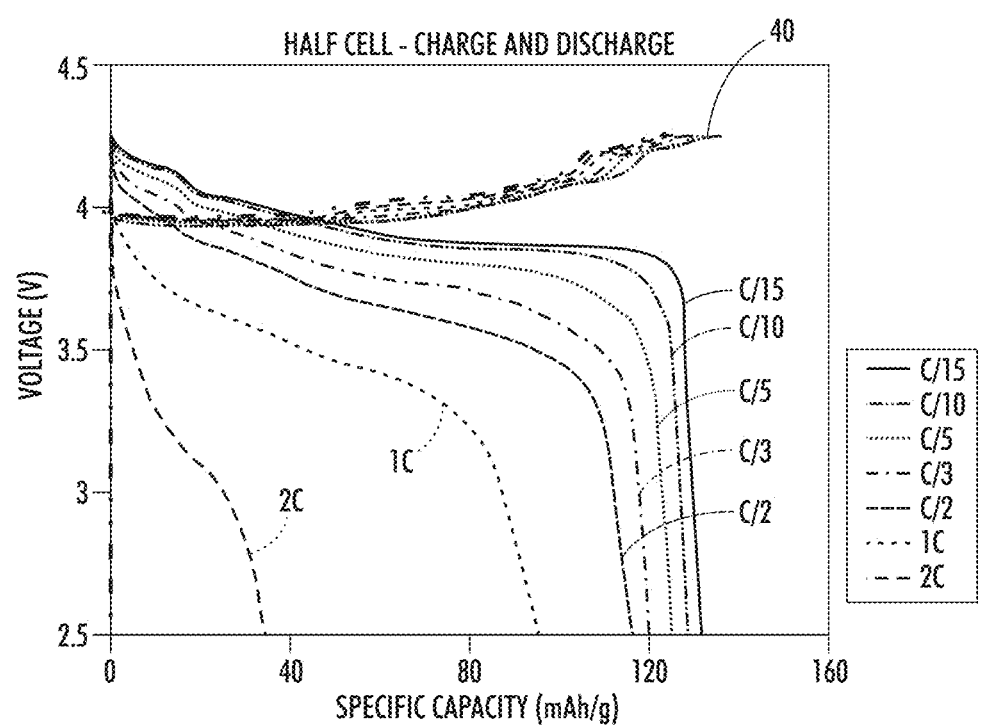
FIG. 4 shows a graph of battery performance of a three dimensional battery electrode.

FIG. 4 shows the discharge and charge performance of the electrode structure above. The upper set of curves 40 show the charge performance. The curves marked with 'C' are the discharge rate performance. The notation 2C, 1C, C/2, etc. indicate the different rates of discharge. Most batteries are rated at 1C, meaning that a 1,000 mAh battery that is discharged at 1C rate should under ideal conditions provide a current of 1,000 mA for one hour. 1C is also known as a one-hour discharge. C designates the discharge rate, rather than the charging rate. 2C may be referred to a half-hour discharge, and C/2 would be a 2 hour discharge.

Figure 6:
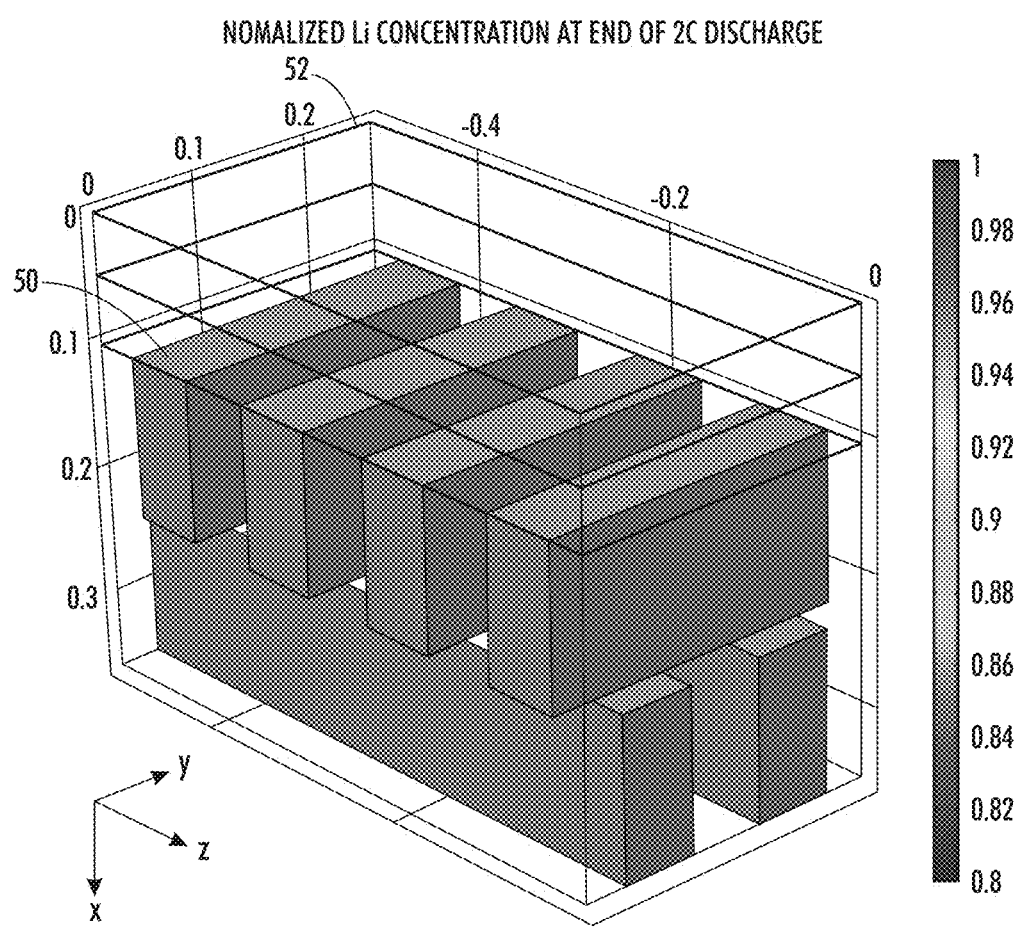
FIG. 6 shows an embodiment of a battery having orthogonal layers with symmetric stripe distribution.

Each layer of material may consist of interdigitated stripes of material of the same composition and dimensions of the stripes in the other layers, or they may be of different dimensions. The arrangement of the stripes may be symmetric. The terms 'symmetric' and 'asymmetric' as used here refer to how the stripes of material are distributed in a volume. In FIG. 6, the stripes such as 50 are uniformly distributed. This may be more easily seen by looking at the upper layer relative to the wire frame 52.

Figure 7:
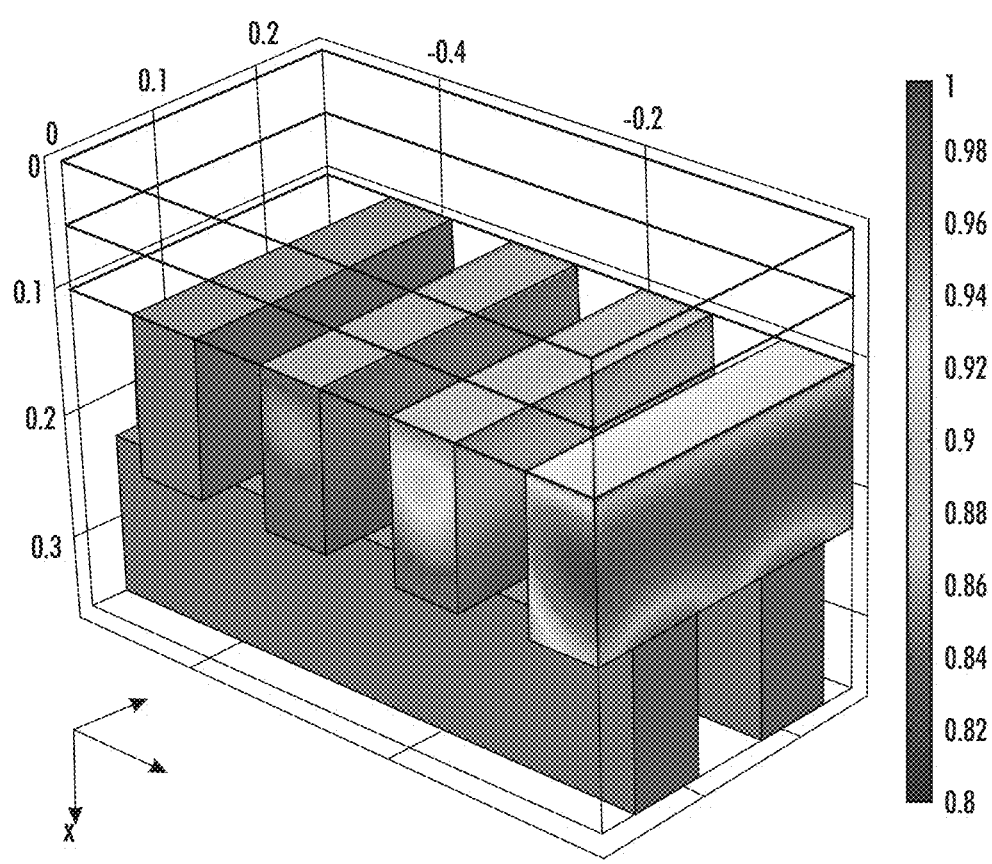
FIG. 7 shows an embodiment of a battery having orthogonal layers with asymmetric stripe distribution.
Figure 8:
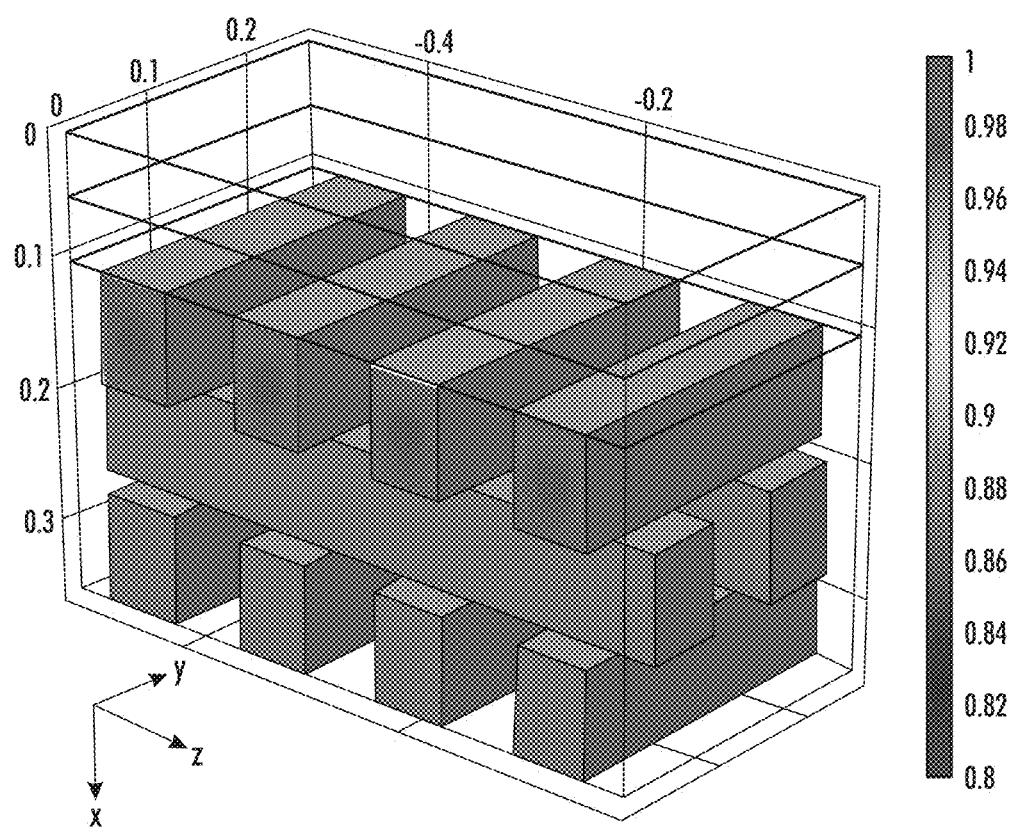
FIG. 8 shows an embodiment of a battery having three orthogonal layers with symmetric distribution.

The previous embodiments, discussed above, have active materials in regions that are 270 um wide and 163 um wide stripes of the intermediate material. The structure shown in FIG. 6 has both active and intermediate materials are in 62.5 um wide stripes. FIG. 7 shows another embodiment of a two layer structure that is asymmetric. As mentioned above, asymmetric refers to the distribution of the stripes within the volume. In FIG. 7, the second layer has the right-most stripe up against the battery cell wall. FIG. 8 shows a three layer stack.

Figure 9:
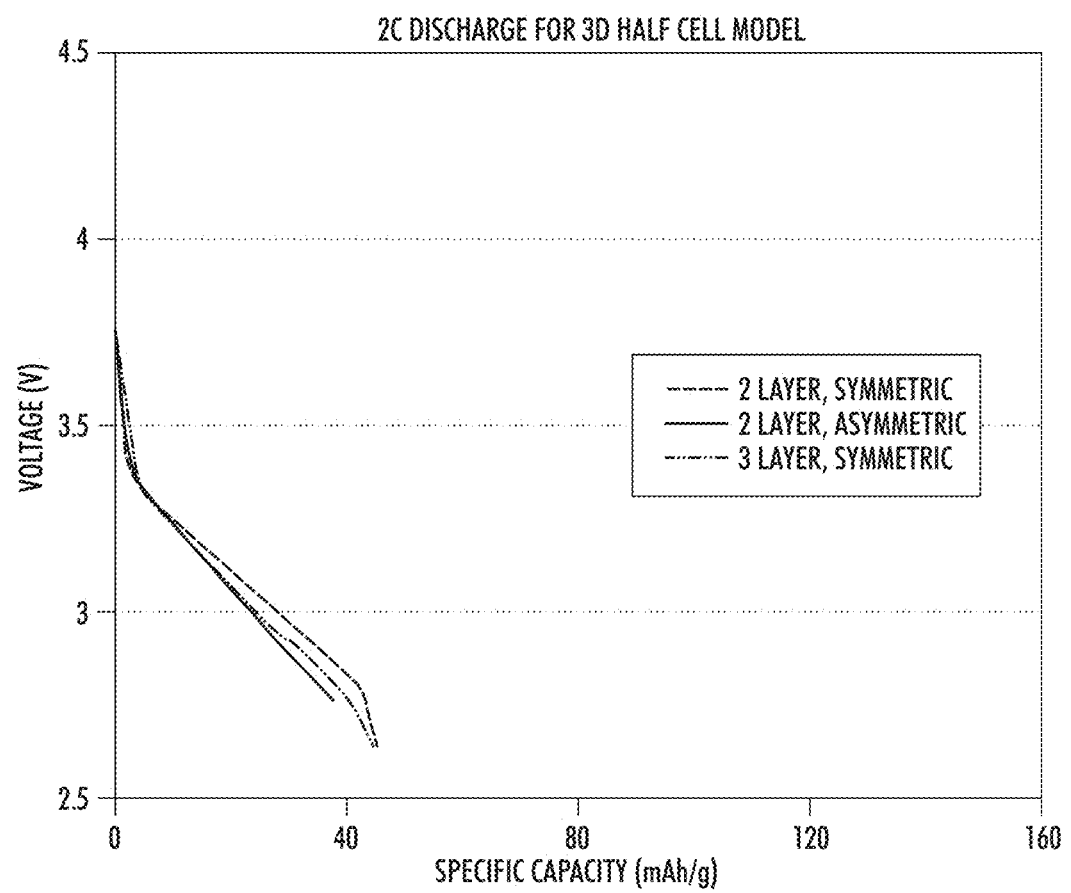
FIG. 9 shows a graph of discharge performance for a three dimensional battery half-cell.

FIG. 9 shows the resulting performance. The two layer symmetric design of FIG. 6 has the greatest specific capacity and better overall performance than the embodiment above with the larger stripes of active material. The two layer asymmetric design does not perform as well as the symmetric design but still outperforms the embodiment with larger stripes of active material. The three layer stack performed comparably to the two layer stack using LCO as the active material with stripes of material set at 62.5 um. It is possible that if the use of a different electrode material was utilized or a different discharge rate, it is possible the three layer stack may outperform the two layer stack design by a larger margin.

Figure 5:
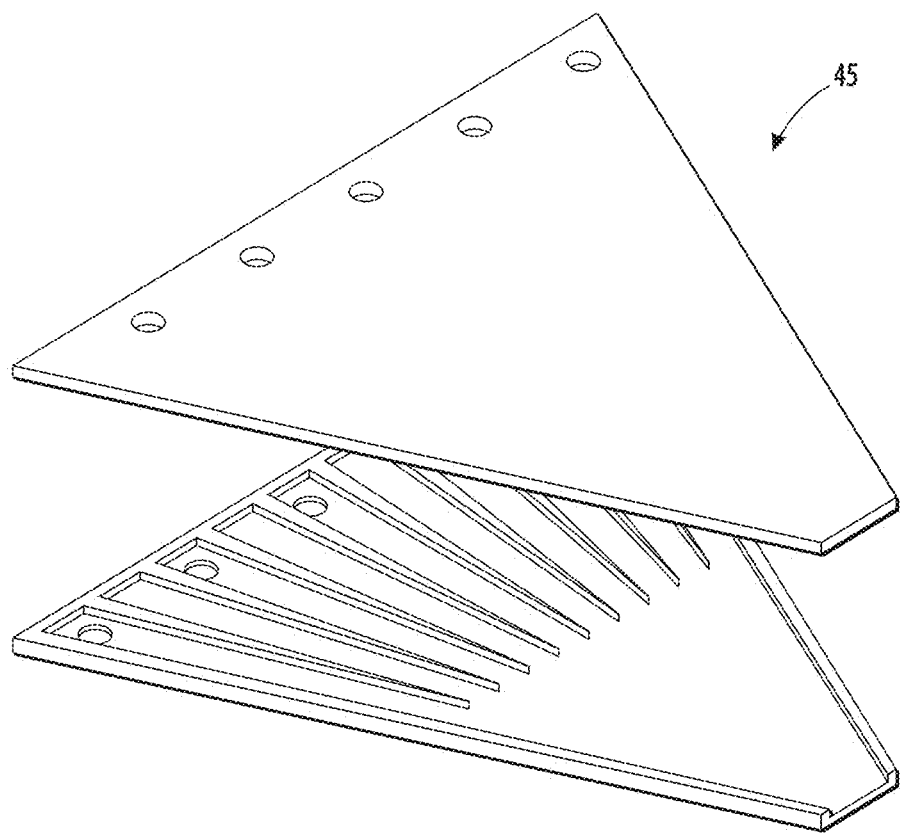
FIG. 5 shows an example of a co-extrusion print head.

The manufacture of these structures using the print head of FIG. 5, or one similar, may be accomplished by depositing these layers on the substrate. Either the substrate may be moved past the print head in multiple passes, or the print head may move by the substrate in multiple passes. Alternatively, two different print heads may be used where each print head prints on alternating layer of material. Each pass deposits another layer of electrodes. In order to deposit them orthogonally, either the print head or the substrate will need to be turned to deposit the next layer.

In this manner, the structured three dimensional electrode allows for shorter transport distances, increasing the energy and power density of a battery. The short transport distances exist because of the fine co-extruded layers that when orthogonally stacked to form a woven like structure help to further reduce transport distances. In the case of a lithium compound, the focus is on maximizing the rate of lithium-ion transport. The three dimensional structures increase the amount of electrode material exposed to electrolyte leading to lower resistive and ohmic losses typically experienced with thicker battery electrode. Standard battery electrodes typically have thicknesses in the range of 50-100 um. The three dimensional structures discussed here may have thicknesses of over 100 um. These electrodes enable greater power and energy density in a similar if not smaller footprint than conventional prismatic and wound battery cells, while also reducing the number of inactive layers, such as separators, current collectors, in a prismatic or wound stack.

Because the three dimensional structures presented increase the amount of electrode material surface area exposed to electrolyte, this supports faster diffusion behavior within a battery cell and has advantages for super capacitor and ultra-capacitor electrodes where the amount of electrode material exposed is critical for electrolytic reactions.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of manufacturing a three dimensional electrode structure, comprising:
    depositing a first layer of contiguous, separated, interdigitated stripes of an active, electrode, paste material and an intermediate material on a substrate in a first direction, the intermediate material being one of either a liquid or gel electrolyte, or a porous material filled with electrolyte; and
    depositing a second layer of contiguous, separated, interdigitated stripes of the active material on the first layer of interdigitated stripes of material and the intermediate material on the first layer in a second direction orthogonal to the first direction.

2. The method of claim 1, further comprising:
    removing the intermediate material from the first and second layers, leaving stripes of the active material with gaps between the stripes of active material; and
    filling the gaps between the stripes of active material with an electrolyte.

3. The method of claim 2, wherein removing the intermediate material comprises heating the structure to burn off the intermediate material.

4. The method of claim 1, wherein depositing the first and second layers comprises passing the substrate past a co-extrusion print head multiple times.

5. The method of claim 1, wherein depositing the first and second layers comprises depositing the layers with multiple passes of a co-extrusion print head past the substrate.

6. The method of claim 1, wherein depositing the first and second layers comprises depositing the first layer with a first print head and the second layer with a second print head.

7. The method of claim 1, wherein depositing the second layer comprises depositing the second layer with a different thickness than the first layer.

8. The method of claim 1, wherein depositing the second layer comprises depositing the second layer with a different interdigitated pattern than the first layer.

9. The method of claim 1, wherein depositing one of the first and second layers comprises depositing interdigitated stripes of active material wider than the intermediate material.

10. The method of claim 1, wherein depositing one of the first and second layers comprise depositing interdigitated stripes of active material having a same width as the intermediate material.

\* \* \* \* \*